United States Patent [19]

Matsuda et al.

[11] Patent Number: 4,914,654
[45] Date of Patent: Apr. 3, 1990

[54] MULTIPLEX TRANSMISSION SYSTEM

[75] Inventors: Yutaka Matsuda, Hiratsuka; Teruhisa Inoue, Ichikawa; Kyousuke Hashimoto, Hiratsuka; Kiyoshi Inoue, Atsugi; Yusaku Himono, Tokyo, all of Japan

[73] Assignee: Furukawa Electric Co., Ltd., Tokyo, Japan

[21] Appl. No.: 177,497

[22] Filed: Apr. 4, 1988

[30] Foreign Application Priority Data

Apr. 6, 1987 [JP] Japan ................... 62-84136

[51] Int. Cl.$^4$ ................ H04J 3/24; H04J 3/02; H04L 1/18
[52] U.S. Cl. ................... 370/94.1; 370/85.1; 371/33
[58] Field of Search ............ 370/9, 60, 94, 940, 370/85, 110.1; 371/32, 33; 375/22

[56] References Cited

U.S. PATENT DOCUMENTS

| 3,676,846 | 7/1972 | Busch | 371/33 |
| 4,577,308 | 5/1986 | Larson et al. | 370/9 |
| 4,706,082 | 10/1987 | Miesterfeld et al. | 340/825.5 |
| 4,715,031 | 12/1987 | Crawford et al. | 370/85 |
| 4,719,458 | 1/1988 | Miesterfeld et al. | 340/825.5 |

OTHER PUBLICATIONS

Anthony J. Bazzini et al "Serial Bus Structures for Automotive Applications" SAE Paper 830536.
Wayne J. Johnson et al, "A Proposal for a Vehicle Network Protocol Standard," SAE Paper 860392.
Ronald L. Mitchell, "A Small Area Network for Cars," SAE Paper 840317.
S. B. Carlo et al, "A Broadcast Protocol for File Transfer to Mulitple Site", IEEE Transactions On Communications, vol. COM-29, No. 22, Nov. 1981.

Primary Examiner—Robert L. Griffin
Assistant Examiner—Wellington Chin
Attorney, Agent, or Firm—Frishauf, Holtz, Goodman & Woodward

[57] ABSTRACT

A multiplex transmission system, in which one of a plurality of nodes, as a transmission node, mutually coupled together through a transmission path transmits data frame by frame to at least one of other nodes as at least one of reception node, and the reception node returns a reception acknowledge signal to the transmitting node upon proper reception of the frame of data. A reception acknowledge signal area comprising a plurality of bits is provided following the frame transmitted from the transmitting node. The reception acknowledge signal area is divided into a plurality of bit areas which are respectively assigned to the plurality of nodes. The reception node returns the reception acknowlege signal to the transmitting node from the respectively-assigned bit areas of the reception acknowledge signal area. As desired, a destination designation area having the same length as the reception acknowledge signal area is provided in a frame and is divided into a plurality of bit areas which are respectively assigned with the plurality of nodes. The individual destination nodes are specified by the respective bit areas of the destination designation area of the frame. Preferably, a pulse width modulation code for discriminating the binary logic based on the size of the pulse width is used as a transmission code at least in the reception acknowledge signal area.

5 Claims, 12 Drawing Sheets

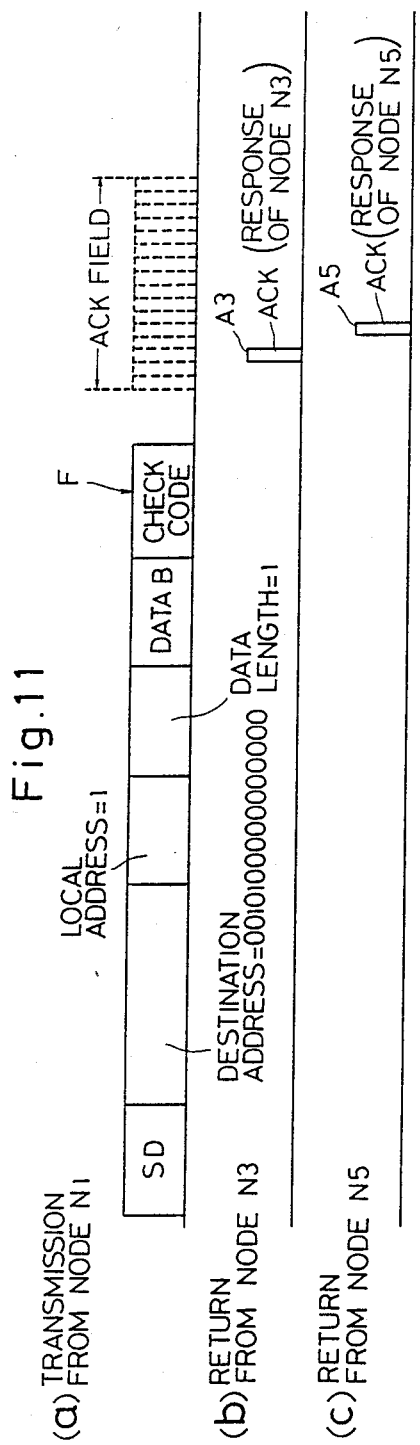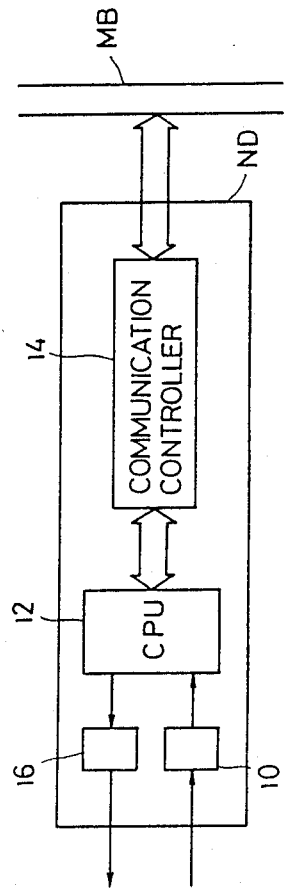

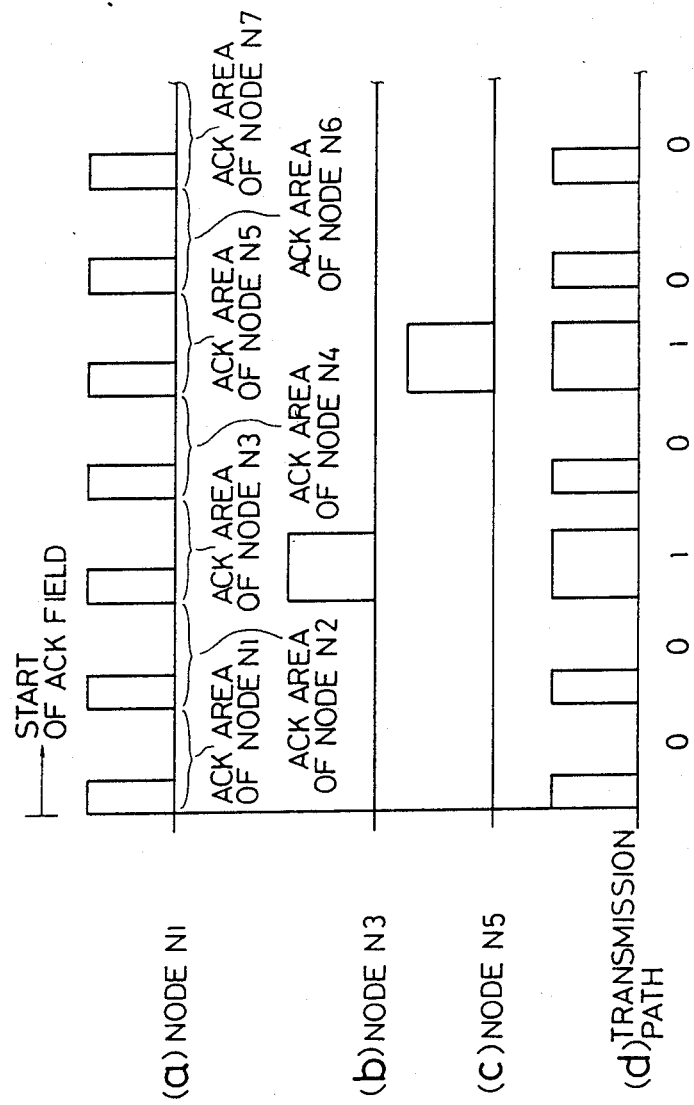

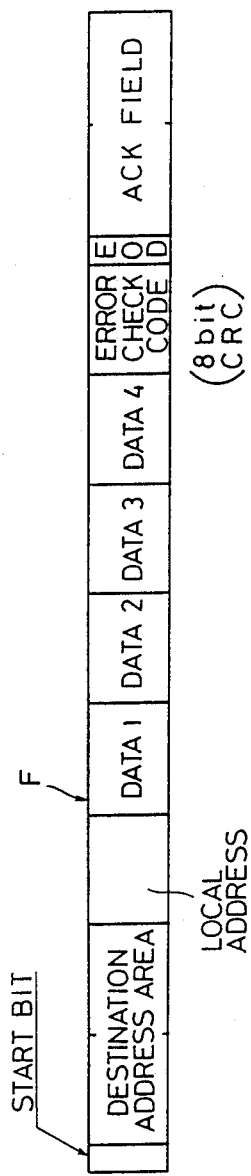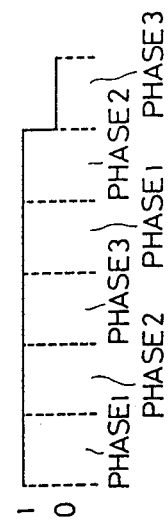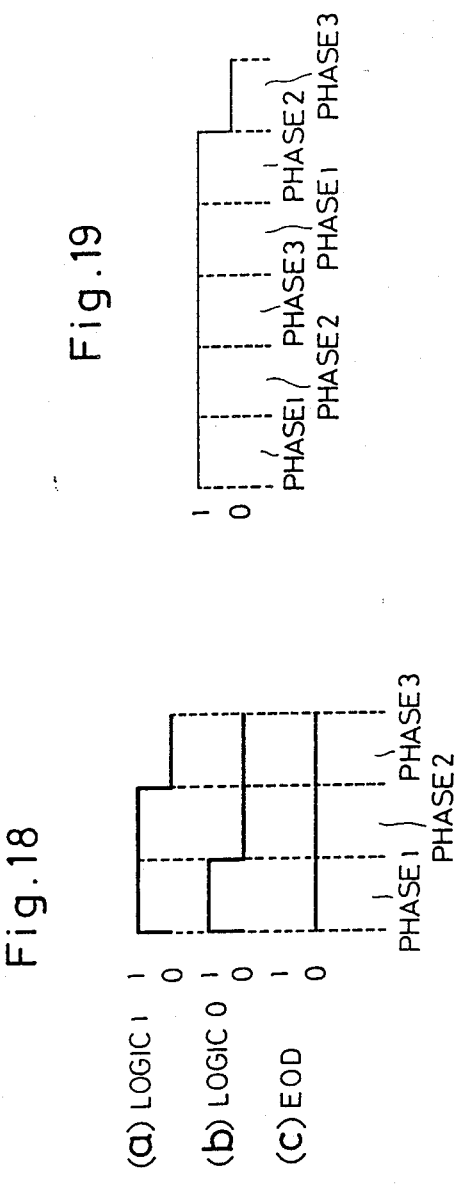

MULTIPLEX TRANSMISSION SYSTEM

BACKGROUND OF THE INVENTION

The present invention relates to a multiplex transmission system using a CSMA/CD (Carrier Sense Multiple Access/Collision Detection) transmission system.

There has been proposed a multiplex transmission system using a CSMA/CD transmission system, which has a plurality of nodes mutully coupled through a transmission path, transmits data from any one of the nodes for each frame having a destination address, and returns a reception acknowledge signal to the transmitting node from a destination node specified by the destination address upon proper reception of the data by the destination node.

Conventionally, various types of such multiplex transmission systems have been proposed. The article "A Proposal for a Vehicle Network Protocol Standard" presented in the SAE International Congress and Exposition (Feb. 1986), discloses a physical message type multiplex transmission system as the first prior art system, in which in order to transmit data from one of a plurality of nodes coupled to a transmission path to another node, a physical address of the destination node is written in a destination designation area of a frame of data, this data frame is transmitted on the transmission path and the destination node specified by the address returns a reception acknowledge signal to the transmitting node upon reception of the frame.

For instance, in the case where this prior art system is applied to controlling the operation of head lamps, small lamps, turn-signal lamps, a horn and the like of a vehicle, it may be desirable that the same vehicle driving information is transferred from one of a plurality of nodes, such as a front multiplex node coupled to the head lamps, small lamps, turn-signal lamps, horns, etc. provided on the front side of the vehicle, a combination switch node provided with a number of switches to turn on or off these components, a meter node for indicating the ON/OFF states of these components, a rear multiplex node coupled to the small lamps, turn-signal lamps, etc. provided on the rear side of the vehicle, to some or all of the remaining nodes. In such a case, sequentially transmitting the same vehicle driving information to the individual nodes provides a significantly low transmission efficiency.

The shortcoming is prevented by providing a so-called simultaneous multi-destination transmission function to the transmission system in which a so-called global address is written in the aforementioned destination designation area of the frame to specify all of the destination nodes and the same data is simultaneously transmitted to all the destination nodes. In this case, if, upon reception of the frame from the transmitting node, all of the destination nodes send their acknowledge signals on the transmission path, a collision would occur. To prevent this collision, therefore, each node is provided with a collision detection function and a transmission inhibition function so that upon proper reception of the frame from the transmitting node, only the reception acknowledge signal of the destination nodes which has the highest priority, can survive to be returned to the transmitting node.

Although this method can solve the above problem concerning with the transmission efficiency, it provides no means to confirm that all the nodes requiring the data have properly received, thus resulting in a low reliability. With those nodes which do not need the data, it is also necessary to discriminate whether or not they should receive the transmitted signal, thus increasing the load of a controller which controls the circuit for executing the multiplex transmission of the individual nodes.

The second prior art system (functional message type) is also disclosed in the aforementioned article "A Proposal for a Vehicle Network Protocol Standard", in which a so-called function address is written in the destination designation area of a frame, a single function address being associated with a plurality of predetermined nodes, each reception node compares the function address of the frame sent on the transmission path from the transmitting node with a reception function address table stored in the reception node to discriminate whether or not it should receive the frame, and, if affirmative, it returns its own address as a reception acknowledge signal to the transmitting node. In this case, if a plurality of reception nodes simultaneously return their reception acknowledge signals, the aforementioned collision would occur. To avoid the collision, therefore, this system is also provided with the aforementioned collision detection and transmission inhibition functions as well as a reception acknowledge signal retransmission function, so that the reception nodes sequentially return their reception acknowledge signal in the order from the highest priority to the lowest one. The transmitting node collates the returned reception acknowledge signals with the transmission function address-physical address correlation table to discriminate if the reception acknowledge signals have properly been returned from the destination nodes specified by the function address.

According to the second prior art, the conventional problem inherent to the first prior art can be solved, but each node should store the transmission function address-physical address correlation table and the reception function address table, thus requiring a large capacity memory and a memory control circuit. This increases the manufacturing cost of the transmission system.

OBJECTS AND SUMMARY OF THE INVENTION

Accordingly, it is an object of this invention to provide a multiplex transmission system which has a high reliability and ensures an effective signal transmission with a simple circuit arrangement.

According to one aspect of this invention, there is provided a multiplex transmission system, in which one of a plurality of nodes, as a transmission node, mutually coupled together through a transmission path transmits data frame by frame to at least one of other nodes as at least one reception node, and the at least one reception node returns reception acknowledge signals to the transmitting node upon proper reception of the frame of data.

In the multiplex transmission system of this invention, a reception acknowledge signal area including a plurality of bits is provided following the frame transmitted from the transmitting node and is divided into a plurality of bit areas respectively assigned to the plurality of nodes. The at least one reception node returns the reception acknowledge signal to the transmitting node from one of the respectively-assigned bit areas of the reception acknowledge signal area.

Preferably, a pulse width modulation code for discriminating a binary logic based on a size (wide or narrow) of the pulse width is used as a transmission code.

Further, as desired, a destination designation area having the same length as the reception acknowledge signal area is provided in a frame and is divided into a plurality of bit areas respectively assigned with the plurality of nodes. The individual destination nodes are specified by the respective bit areas of the destination designation area of the frame.

It is preferable that upon reception of the reception acknowledge signal from the at least one reception node, the transmitting node compares a content of the received reception acknowledge signal area with a content of the destination designation area of the frame so as to discriminate successfulness of a signal transmission.

The above and other objects, features, and advantages of the invention will be more apparent fron the ensuing detailed description taken in connection with the accompanying drawings.

BRIEF DESCRIPTION OF THE DRAWINGS

FIG. 11 is an exemplary timing chart illustrating the relationship between a frame transmitting timing and a return timing of an ACK signal returned from each node in the multiplex transmission system of this invention;

FIG. 16 is a modified-waveform diagram for explaining the return timing of the ACK signal from each reception node in the case where a PWM code is used as a transmission code;

FIG. 17 is an exemplary diagram illustrating another example of the frame format used in the multiplex transmission system of this invention;

FIG. 18 is a waveform diagram for explaining a binary logic in the case where a PWM code is used as an end of data (EOD) code;

FIG. 19 is a diagram illustrating an example of a start bit;

FIG. 25 is a schematic block diagram illustrating the arrangement of each node for realizing the multiplex transmission system of this invention.

DETAILED DESCRIPTION

To begin with, conventional multiplex transmission systems using various CSMA/CD transmission systems, as applied to automobiles, will be explained below.

Figure 1:
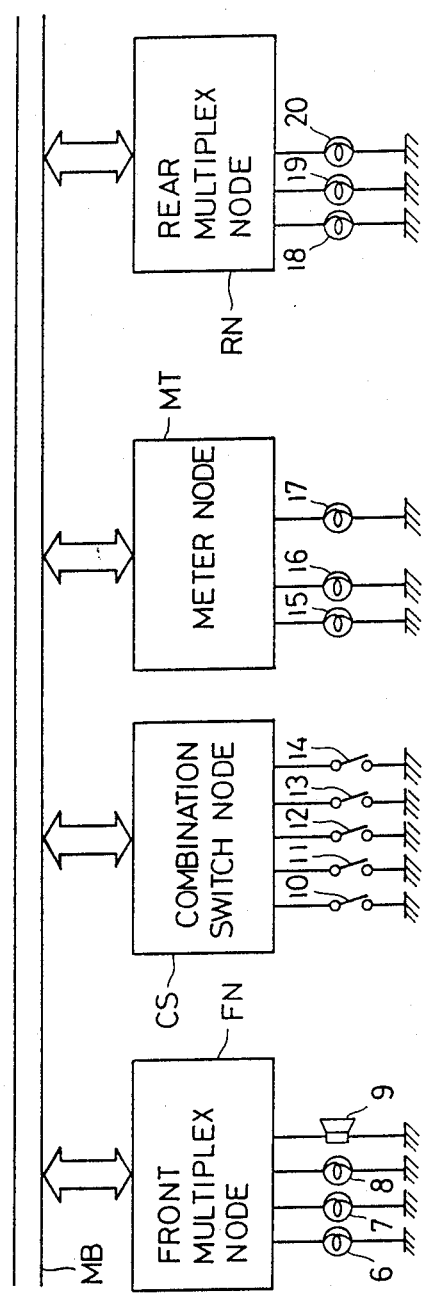
FIG. 1 is a schematic block diagram illustrating the arrangement of a multiplex transmission system for vehicles using a CSMA/CD transmission system.

Referring to FIG. 1, the schematic arrangement of the multiplex transmission systems for automobiles will now be explained. In the figure, a plurality of nodes consisting of, for example, a front multiplex node FN, a combination switch node CS, a meter node MT and a rear multiplex node RN are mutually coupled together through a multiplex bus (transmission path) MB comprising a wire or an optical fiber or the like. The front multiplex node FN is coupled to a front turn-right signal lamp 6, a front turn-left signal lamp 7, a front small lamp 8, a horn 9, etc. The combination switch node CS is coupled to a turn-right switch 10, a turn-left switch 11, a small-lamp switch 12, a horn switch 13, a head-lamp high beam switch 14, etc. The meter node MT is coupled to a turn-right indicator 15, a turn-left indicator 16, a head-lamp high beam indicator 17, etc. The rear multiplex node RN is coupled to a rear turn-right signal lamp 18, a rear turn-left signal lamp 19, a tail lamp 20 (which is turned on when the small lamp switch 12 is ON), etc.

In the multiplex transmission system for vehicles according to the first prior art, vehicle driving information is transmitted for each frame F, as shown in FIG. 2(a).

The frame F has a SD (Starting Delimiter) code, a destination address, a local or source address, a data length, data 1 to data N and a check code.

The SD code is a specific code indicating the start of the frame F, and the reception nodes acknowledge the start of the frame F upon reception of the SD code. Provided that the local address and destination address are each specified by 8 bits, each node within the network used by the multiplex transmission system is assigned with a figure ranging from 0 to $(2^8-1)=255$ as its address. In other words, a maximum of 256 nodes are coupled within the network and the individual nodes are assigned with different binary addresses selected from 00000000 to 11111111.

Actually, provided that 11111111 is designated as the destination address which is called the global address, the multi-destination transmission function is often added to every node and 255 nodes can be coupled within the network at a maximum.

According to such a conventional multiplex transmission system for vehicles, therefore, there are only two ways in a single frame transmission, namely the frame transmission to a particular node or to all the nodes.

The "local address" field is written with the address of that node which transmits the frame F so that another node, upon reception of this frame, can detect from which node the frame has been transmitted.

Further, the "data length" field is written with the number of data following this field; if there are N data, then N is written as the data length. Upon reception of the frame, the reception nodes read the data by the data length.

The transmitted content of the frame following the data field is the check code (error detection code) which can indicate the end of the frame.

In order to assure the data transmission, each reception node checks whether or not the contents of the received frame are correct, and if they are correct, the reception node sends its local adddress onto the transmission path MB as an ACk signal A upon elapse of a time $T_1$ within a time $T_2$ after completion of the frame transmission, as shown in FIG. 2(b).

The node which has transmitted the frame F receives the ACK signal A and recognizes that the data has been properly received by the reception nodes.

If the data is not properly received by the reception node (if a transmission error is detected by the check code) or a framing error occurs (if the length of the actually-sent data is shorter or longer than the one specified by the data length), the reception node does not return the ACK signal to the transmitting node as shown in FIG. 3(b). In this case, as shown in FIG. 3(a), if the ACK signal is not returned within a predetermined time $T_2$ after the completion of the the frame transmission, the transmitting node considers that the transmission of the frame F is unsuccessful and starts retransmitting the same frame F.

Figures 2, 3, 4:
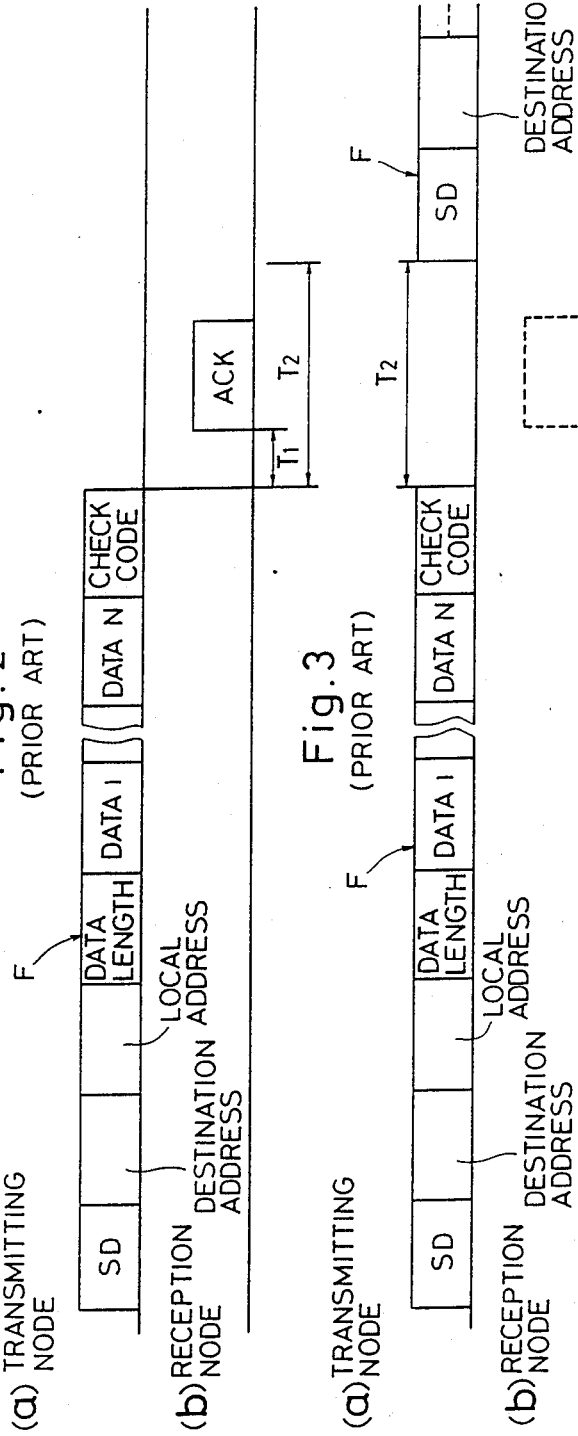
FIGS. 2 to 4 are exemplary timing charts for explaining the relationship between a frame transmitting timing and a return timing of a reception acknowledge (ACK) signal in the multiplex transmission system for vehicles according to the first prior art.

FIG. 4 illustrates the case where one node simultaneously transmits the same frame to the other nodes. As shown in FIG. 4(a), the transmitted frame in this case has the same structure as the one involved in frame transmission to one node, but the destination address would be the global address (11111111) so that all the nodes, except the transmitting node, coupled to the transmission path MB receive the frame of data. If all the reception nodes properly receive the data, they simultaneously return their local addresses as the ACK signals A upon elapse of a given time $T_1$ ($<T_2$) after the completion of the frame transmission, as shown in FIG. 4(b). Provided that 255 nodes are coupled within the network through the transmission path MB constituted by, for example, an optical fiber and "1" indicates the lighted state and "0" indicates the non-lighted state, the transmitting node would receive "11111110" as the ACK signal. In this case, it is also assumed that each node is provided with the collision detection function for detecting the collision for each bit and the transmission inhibition function for inhibiting the transmission of the data from the succeeding bit with respect to a signal having a low priority upon occurrence of the collision.

In other words, the transmitting node receives the ACK signal A from those of the reception nodes whose addresses are strong enough not to be changed when colliding with an inversion signal due to the structure of the transmission path and can simply attain the acknowledgement that at least one of all the reception nodes has properly received the frame in the multi-destination transmission. This prior art transmission system is not, therefore, suitable in data transmission requiring a high reliability.

Figure 6:
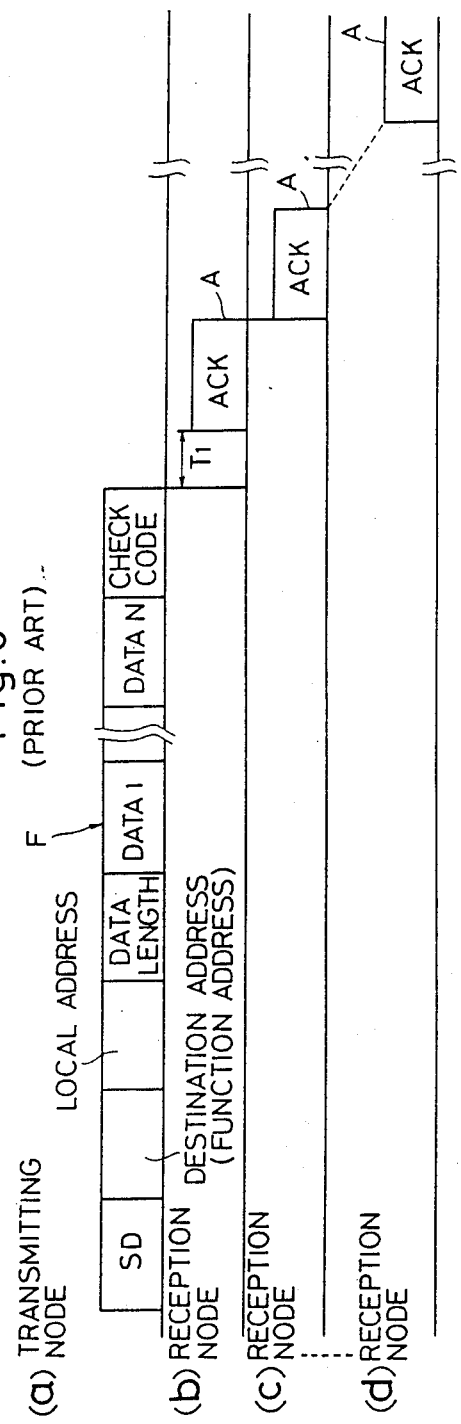
FIGS. 6 and 7 are exemplary timing charts for explaining the relationship between a frame transmitting timing and a return timing of an ACK signal in the multiplex transmission system for vehicles according to the second prior art.

In the multiplex transmission system for vehicles according to the second prior art, the vehicle driving information may be transmitted with the frame format as shown in FIG. 6. As shown in FIG. 6(a), the frame format in this case is the same as the one shown in FIGS. 2-4; however, a functionally-given address (function address), not a physical address, is designated as a destination address and the reception nodes return the ACK signals A as shown in FIGS. 6(b)-6(d) in accordance with this address. Here, the function address corresponds to the functional addressing mentioned in the article "A Proposal for a Vehicle Network Protocol Standard" presented in the SAE International Congress and Exposition (Feb. 1986).

In the case shown in FIG. 5, if the physical addresses of nodes N1-N5 are 1 to 5, respectively, the function adddress to be transmitted from the node N1 may be determined as illustrated in the following Table 1.

From the Table 1, therefore, the function address 4 indicates that the nodes N2 and N4 are the destination nodes while the function address 5 indicates that the nodes N2, N4 and N5 are the destination nodes.

TABLE 1

| Function Address | Physical Address | | | |
|---|---|---|---|---|
| | 2 | 3 | 4 | 5 |
| 1 | * | | | |
| 2 | | * | | |
| 3 | | | * | |
| 4 | * | | * | |
| 5 | * | | * | * |
| 6 | | * | | * |

The following explains the second prior art system more specifically.

The individual nodes N1-N5 have their respective correlation tables for a transmission use between the function addresses and the physical addresses (see the exemplified Table 1 for the node N1) so as to be recognizable to which physical nodes to transmit a frame of data and reception function tables (e.g., Table 2 given below for the node N4) for a reception use so as to be recognizable from which function address the frame should be received.

TABLE 2

| Function Address To Be Received By Node N4 |
|---|
| 3 |
| 4 |
| 5 |
| 8 |
| 11 |
| 14 |
| . |
| . |
| . |

In this example, the first three function addresses (3, 4 and 5) are to be transmitted from the node N1 and the next three function addresses (8, 11 and 14) are to be transmitted from the node N2.

Assuming that data B is to be transmitted from the node N1 to the nodes N3 and N5, it is understood from the function address-physical address correlation table (Table 1) that the same frame can be simultaneously transmitted to the nodes N3 and N5 by setting the function address to "6".

Figure 7:
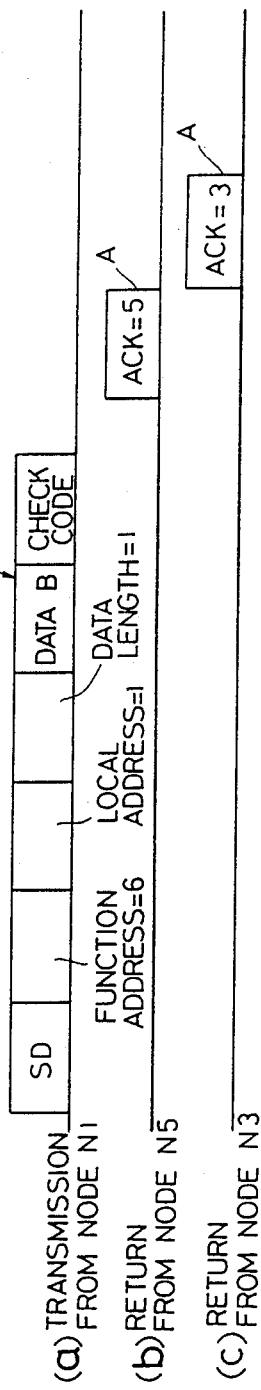

Therefore, the node N1 transmits the frame F as shown in FIG. 7. And, the nodes N3 and N5 recognize that they should receive the frame F with the function address "6" based on their own reception function tables (similar to the Table 2 for the node N4).

The nodes N3 and N5 receive the frame F and return their local addresses as the ACK signals A to the node N1 if no data error is detected by checking the check code as per the first prior art system as shown in FIGS. 2-4. Although the ACK signals A in this case may simultaneously be returned from a plurality of nodes as is the case in the multi-destination transmission as shown in FIG. 4, the aforementioned problem of the first prior art system can be overcome by providing the bit-by-bit collision detection and the transmission inhibition function from the succeeding bit with respect to a low priority signal as well as an ACK signal retransmission function to each node. With this design, therefore, upon completion of the frame transmission, the ACK signals from the nodes which have received the frame F are aligned in accordance with the descending order from the reception node having the strongest address code to the one having the weakest address code in consideration of the transmission path structure.

The node that has transmitted the frame F collates the returned ACK signals with the function address-physical address correlation table for transmission use such as the Table 1 to detect if the ACK signals are returned from all the nodes which should receive the frame F.

If the ACK signal is not returned from any one of the expected reception nodes, the same frame is retransmitted in the same manner as is done in the node-to-node transmission shown in FIG. 3.

In this case, if the number of the nodes allowed to receive the frame by a single function address is too large, the bus may be occupied only by the ACK signals concerning this frame. To avoid this shortcoming, therefore, the number of nodes allowed to return the ACK signals by a single function address is limited.

According to the first prior art multiplex transmission system for vehicles (see FIGS. 2-4), in transmitting data from one node, it is either one or all of the remaining nodes which can be designated as the destination. If this data transmission is taken as the flow of a multiple signal in the multiplex transmission system for vehicles as shown in FIG. 1, the same signal is often transmitted from one node to a plurality of nodes as indicated by the following Table 3.

TABLE 3

| Signal Name | Meter Node | Front Node | Rear Node |
|---|---|---|---|
| Turn-right Switch | | * | * |
| Turn Left Switch | * | * | * |
| Small-lamp Switch | | * | * |
| Horn Switch | | * | |
| Head-lamp Switch | * | * | |

Figure 8:
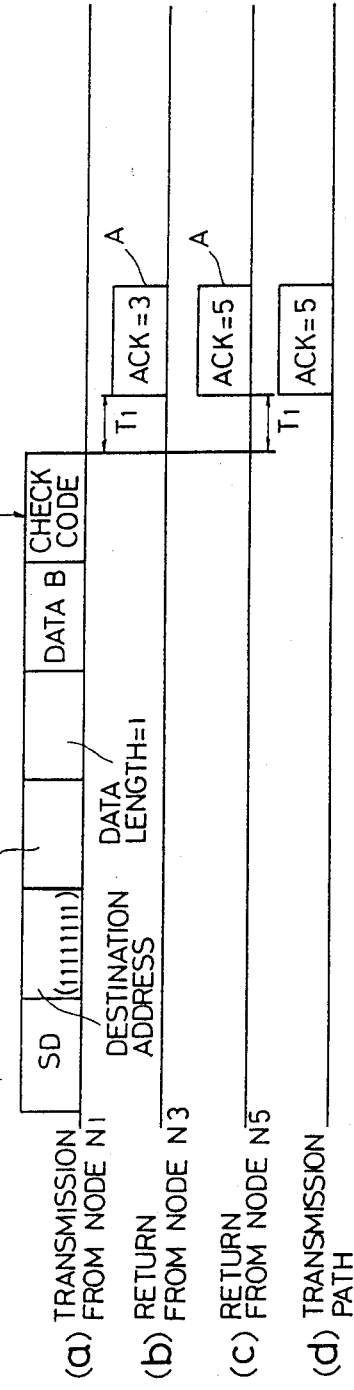
FIGS. 8 and 9 are exemplary timing charts for explaining the relationship between a frame transmitting timing and a return timing of an ACK signal in the case where the same data is transmitted to a plurality of nodes using the multiplex transmission system for vehicles according to the first prior art as shown in FIGS. 2–4.
Figure 9:
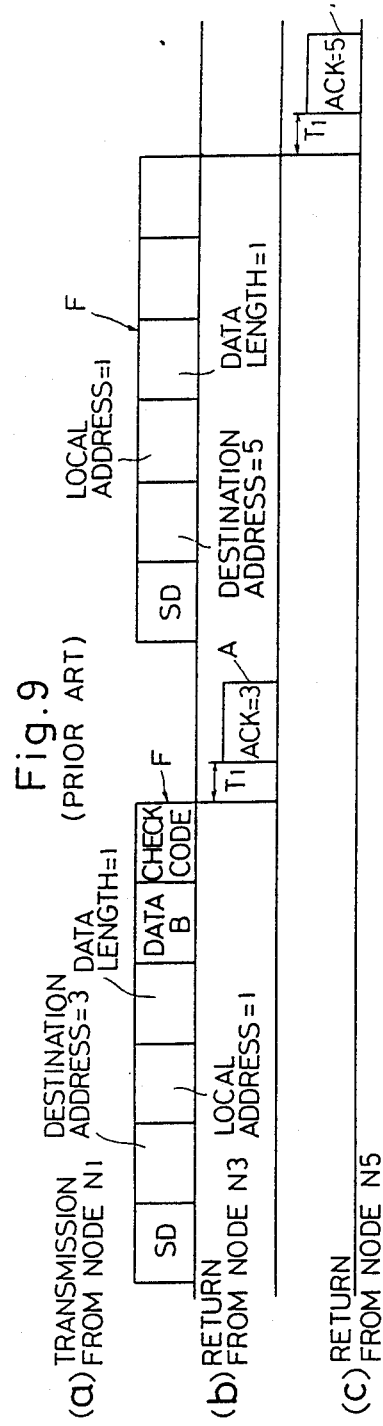

To transmit the same signal to a plurality of nodes according to the first prior system, a plurality of frames should be transmitted as shown in FIG. 9, reducing the transmission efficiency. Here, FIG. 8 illustrates that the same data B is simultaneously transmitted to the nodes N3 and N5 from the node N1; in this case, the ACK signals are simultaneously returned from the nodes N3 and N5 as shown in FIGS. 8(b) and 8(c). Consequently, ACK 5 having a high priority can be observed on the transmission path, as shown in FIG. 8(d). FIG. 9 illustrates the case where the same data B is transmitted to the nodes N3 and N5 from the node N1 and the transmission acknowledgement needs to be returned from each node. In this case, the nodes N3 and N5 return the ACK signals with the respective delays after reception of their respective frames (see FIG. 2(a)), as shown in FIGS. 9(b) and 9(c).

Therefore, if the data is transmitted with the frame format permitting the data transmission to all the nodes, the following problems would be raised.

(1) Since acknowledgement cannot be attained which indicates that all the nodes requiring the data have properly received, this system is not suitable to a multiplex transmission system for vehicles that demands a high transmission reliability.

(2) Even with regard to the nodes which do not need the data, it is necessary to discriminate whether or not they should receive the data, thus increasing the load of a controller which controls a circuit for executing the multiplex transmission.

Figure 5:
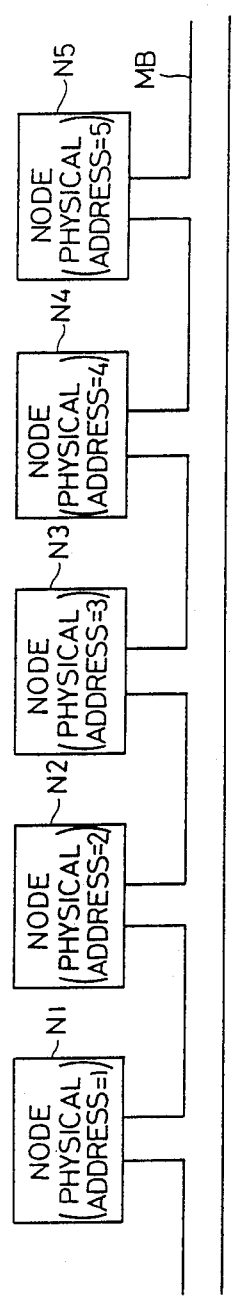
FIG. 5 is a schematic block diagram illustrating the arrangement of the CSMA/CD transmission system for explaining the second prior art.

With the help of the function addressing, the second prior art system (as shown in FIGS. 5-7) can solve the aforementioned problems of the first prior art system, namely, that data transmission to a plurality of arbitrary nodes is not possible and it is not possible in transmission to a plurality of nodes to attain the acknowledgment which indicates that all the nodes expected to receive the data have properly received it. To realize the function addressing, however, each node should have a large memory to store the transmission function address-physical address correlation table and the reception function address table, as shown in the Tables 1 and 2, and should also have a memory control circuit. This inevitably increases the scale of the circuit necessary to realize the multiplex transmission system and hence increases the manufacturing cost of the transmission system.

A multiplex transmission system according to one embodiment of this invention which transmits vehicle driving information between a plurality of nodes provided in a vehicle will now be explained.

The multiplex transmission system according to this embodiment has the same schematic arrangement as shown in FIGS. 1 and 5, and uses the CSMA/CD transmission system in which a plurality of nodes are coupled together through a bus serving as a transmission path, vehicle driving information is transmsitted from any one of the nodes for each frame having a destination address and an ACK signal is returned to the sender from the node designated by the destination address when the destination node has properly received the frame.

Figure 10:
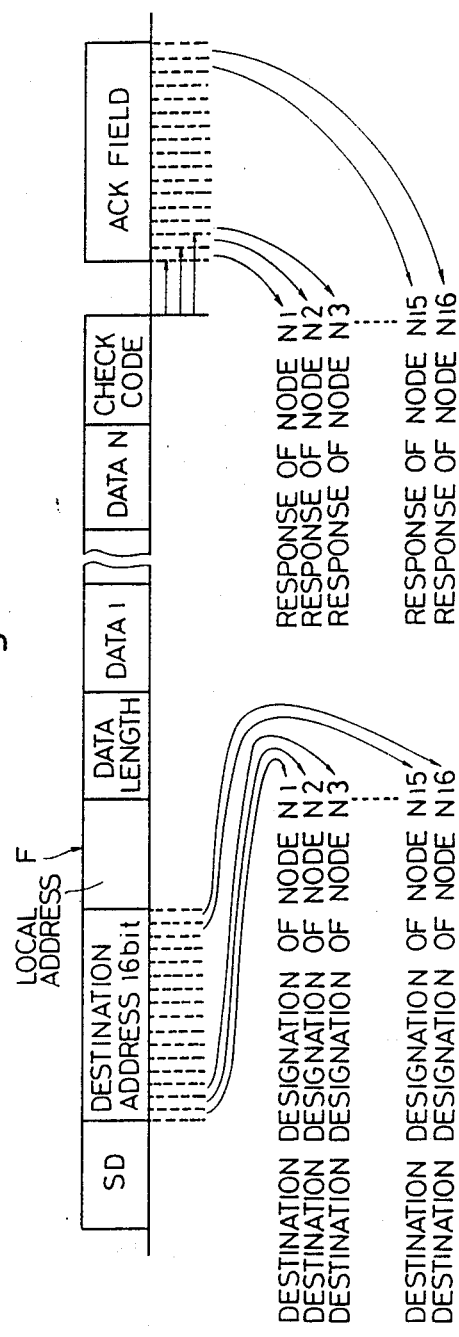
FIG. 10 is a exemplary diagram illustrating a frame format used in a multiplex transmission system for vehicles according to one embodiment of this invention.

According to this multiplex transmission system for vehicles, the vehicle driving information is transmitted for each frame F having the format as shown in FIG. 10.

The frame F includes an SD code, a destination address (16 bits), a local address, a data length, data 1 to data N and a check code.

The SD code is a specific code indicating the start of the frame F. The destination address, different from the one involved in the prior art systems, is designated by a value of a physical area assigned in the destination address field for each node, not by a coded value of a physical address (or a real address), e.g., "00000010" for a real address "2" and "00000011" for a real address "3" expressed in one byte. More specifically, an address area consisting of a plurality of bits is provided in the frame F to specify the destination address and is divided into a plurality of bit areas (destination designation areas), and the divided bit areas are respectively assigned to the addresses of the nodes.

FIG. 11 illustrates an example of a frame having such a destination address field. In this example, each node is assigned with one bit of the destination address field consisting of 16 bits, its bit position differing from the bit position of another node. According to this embodiment, these 16 bits are respectively assigned to the nodes from the first bit in the ascending order of the physical addresses of the nodes, and the nodes are designated by setting their respective bits to 1.

For instance, to designate the nodes N3 and N5 as the destination, the destination address having its third and fifth bits from the start set to 1 and the remaining bits set to 0, i.e., 0010100000000000, needs to be transmitted.

The destination address is normally assigned such that one bit is assigned to each node; however, as needed, a plurality of bits may be assigned to each node and/or the destination nodes may be assigned in an arbitrary order.

The local address field through the check code field following the destination address field are the same as those used in the prior art systems.

An ACK field has its ACK signal return areas assigned for the respectively nodes in the same order as the destination address field for use in acknowledgement of the proper reception of the frame. More specifically, the ACK signal return areas having the same length as the destination designation areas of the destination address is provided, and the ACK signal specific to each node is returned at the ACK signal return area corresponding to the destination designation area associated with this node.

Figure 12:
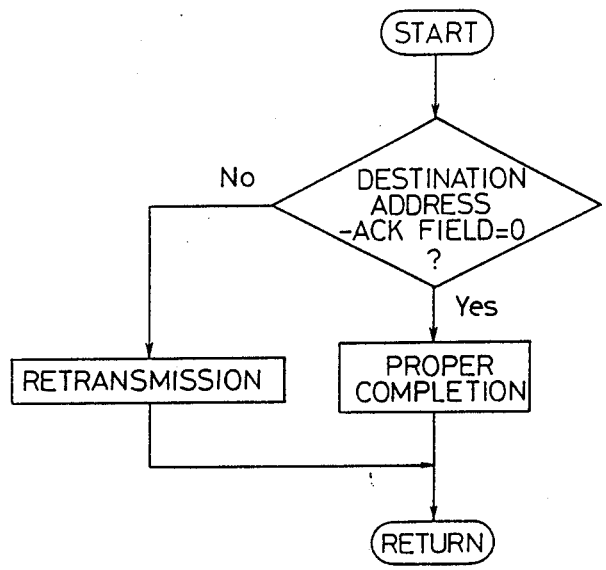
FIG. 12 is a flowchart for determining whether or not signal transmission is properly executed.

According to this embodiment, if both of the nodes N3 and N5 have properly received the frame, the nodes N3 and N5 send 1 to the third and fifth bits of the ACK field, respectively, and the node N1 receives "0010100000000000" as the ACK signals A3 and A5. The node N1 which has transmitted the frame performs a operation as to whether or not the destination address coincides with the value of the ACK field (see the flowchart as shown in FIG. 12) in order to discriminate whether or not the desired frame F has been properly transmitted to the destination. In other words, when one node transmits the frame F to the destination and receives the ACK signals from other nodes, the transmitting node compares the information carried by the ACK signals with the information of the destination address of the frame to discriminate the successfulness of the signal transmission.

Figure 14:
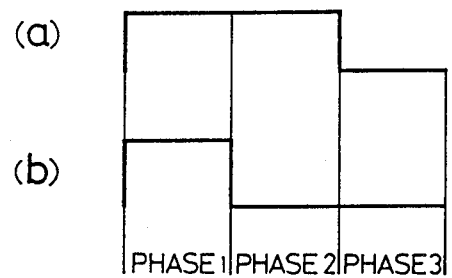
FIG. 14 is a waveform diagram for explaining a binary logic in the case where a pulse-width modulated (PWM) code is used as a transmission code.
Figure 15:
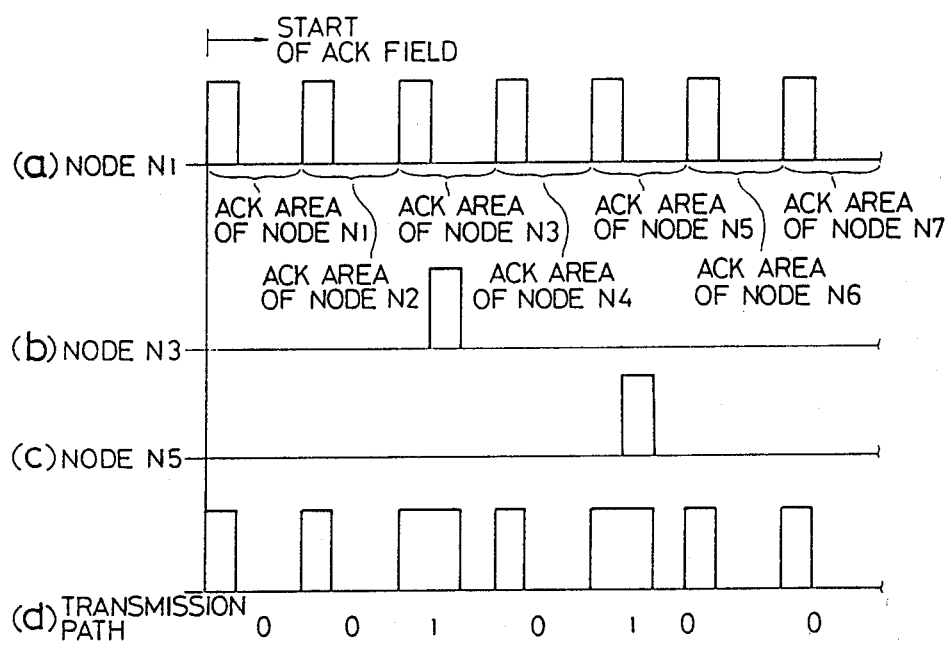
FIG. 15 is a waveform diagram for explaining the return timing of the ACK signal from each reception node in the case where a PWM code is used as a transmission code.

In returning one bit of ACK signal in the ACK field, it is difficult to get the transmission timing. However, with the use of the PWM codes as shown in FIGS. 14(a) and 14(b) where the phase 1 indicates the beginning of a logical 1 bit, the phase 2 indicates a logical "1" when it is "1" and a logical "0" when it is "0", and the phase 3 is a logical "0" duration temporarily set for phase 1, transmitting the portion of the phase 1 from the transmitting node can ensure that all the nodes easily get the transmission timing in the ACK field, as shown in FIGS. 15(a) to 15(d). Alternatively, as shown in FIGS. 16(a) to 16(b), all the reception nodes can easily get the transmission timing in the ACK field if the transmitting node transmits "1" for the portion of the phase 1 of each bit of ACK signal return areas, and the reception node counts the pulse on the transmission path in order to return the ACK signal to the transmitting node in synchronism with the rising or falling of the phase 1 output from the sender in the ACK signal return region associated with the reception node. That is, in this case, the pulse width modulation code for discriminating the binary logic (logic 1 or logic 0) based on the wideness or narrowness of the pulse width is used as the transmission code. The pulse width modulation code may be used only in the ACK field or in any field in the frame. The durations of the individual phases can be arbitrarily set and may of course differ from one another; however, setting these phases to have equal durations can provide the simplest circuit arrangement.

With the use of such destination address designation system, since it is possible to transmit data from one node to a plurality of arbitrary nodes, the same signal can be sent to a plurality of nodes in a single frame transmission at the minimum.

In addition, unlike the simultaneous multi-destination transmission performed in the first prior art system, the ACK signals can be returned from all the nodes designated as the destination, thus ensuring a sufficiently high reliability of multiplex transmission. Further, since the function addressing is not employed in this embodiment, each node need not store a function address-physical address correlation table so that it is unnecessary to provide a large memory or a memory control circuit. This can reduce the scale of the necessary circuit and contribute to reducing the manufacturing cost of the system.

Figure 13:
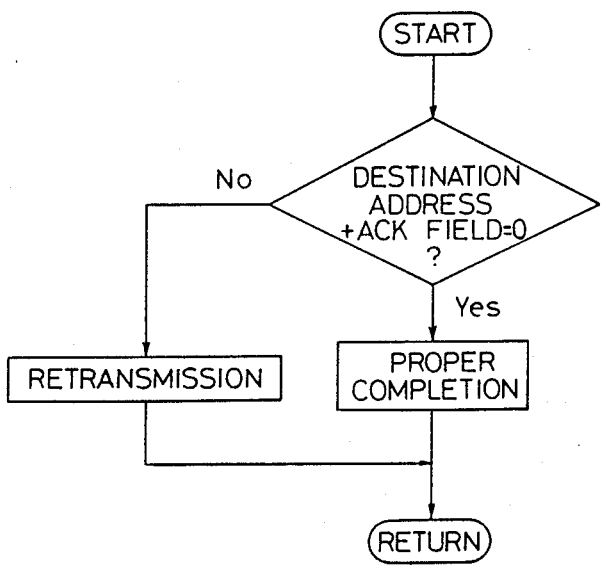
FIG. 13 is a modified version of the flowchart for determining whether or not signal transmission is properly executed.

Although "1" is sent to the areas assigned in designating the destination nodes according to the above embodiment, the phase can be set to the opposite type without problems. That is, if the destination designation areas are set to "0" to designate the destination and to "1" to designate no destination, the checking of the proper completion of the frame transmission/reception as shown in FIG. 13 can be executed by checking whether or not the value of the destination address plus the value of the ACK field in the transmitted frame becomes 0.

In addition, according to this embodiment, 16 nodes can be coupled together at the maximum; however, an increase in the number of nodes to be coupled to the multiplex transmission path can be coped with increasing the lengths of the destination designation area and the ACK field.

In the above embodiment, the quantity of data is variable and the data length is included in the frame. However, if a specific PWM code is included in the frame to indicate the end of the data, the quantity of data can be varied without including the data length in the frame.

FIG. 17 illustrates the frame format used in the above case. In the figure, the specific code EOD (End of Data) for indicating the end of data is neither the logic "1" (FIG. 18(a) or the logic "0" (FIG. 18(b); when one bit of the code appears as shown in FIG. 18(c), the reception node designated by the destination address area recognizes the end of data. According to the frame format as shown in FIG. 17, the preceding one byte to the detection of the code EOD is an error check code (here, an 8-bit CRC), and the preceding 4 bytes to this error check code until the end of the local address can be recognized as actual data.

In this case, a code for indicating the start of the frame need not be of a special form such as the SD code used in the first embodiment, but may be a code as shown in FIG. 19, which has a continuous high-level duration over 5 phases. All the nodes except the transmitting node can recognize the start of the frame by detecting this code.

Figure 20:
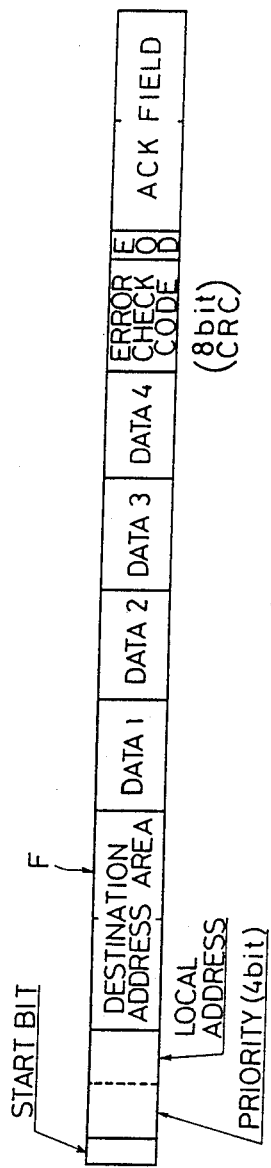
FIGS. 20 to 23 are exemplary diagrams illustrating a further example of the frame format used in the multiplex transmission system of this invention.

Further, in the above embodiment, the local address is used as acknowledgment of the frame. However, there are 16 nodes which can be designated as the destination, so that 4 bits are sufficient for recognition of the local address and this 4-bit local address plus a 4-bit priority bit may be provided preceding to the destination address area, as shown in FIG. 20.

Figure 21:
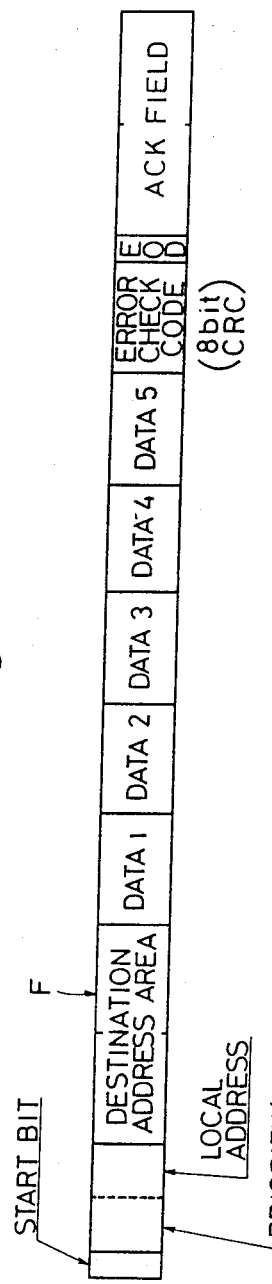

These embodiments can be applied to the case where the quantity of data is a constant for every frame or the data length is fixed. For instance, assuming that the data in the embodiment shown in FIG. 20 is fixed to be 5 bytes, the frame format would be as shown in FIG. 21. In this case, the EOD indicating the end of the data need not be provided, but it may be used to provide a sufficient time for error checking on the reception side.

Figure 22:
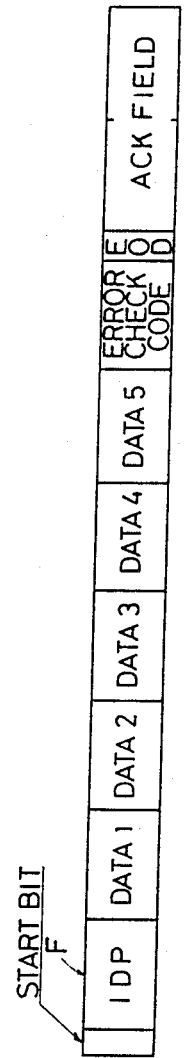

In the above embodiments, the addresses of the destination node and transmitting node (source address) are included in the frame as a frame identifier. As an alternative, a frame identification code having no relationship with the node address may be introduced without providing the node address in the frame and used as the priority bit for a message. FIG. 22 illustrates the frame format designed in the above manner, which produces the following effects. The "IDP" (Identification with Priority) in the format is a frame identification code and also indicates the priority of the frame.

The frame identification code will further be explained with reference to the multiplex transmission system for vehicles as shown in FIG. 1. First, if the local address is included in the frame identifier, the reception node may decrypt the received data in such a manner that the front multiplex node and the rear multiplex node which are expected to receive the data, for example, discriminate from a frame with the local address "5", that the j-th bit signal of the i-th byte sent from the node having the address "5" (e.g., the combination switch node) is associated with the small-lamp switch. In this case, if the location of the small-lamp switch is changed to the cluster switch of the meter node from the combination switch of the combination switch node as a matter of design choice and the small-lamp switch signal is generated from the meter node, it is naturally necessary to modify the meter node to ensure multiplex transmission of data of the small-lamp switch and it is also necessary to modify the data decryption software for all the reception nodes so that the reception nodes can change the discrimination from that the j-th bit signal of the i-th byte of the data transmitted from the node with the old address "5" (the combination switch node) is associated with the small-lamp switch to that the q-th bit signal of the p-th byte of the data transmitted from the node with the address "3" (e.g., the meter node) is associated with the small-lamp switch.

If the frame identification code independent on any node address is used as the frame identifier, however, the frame format does not necessitate the above modification of the data decryption software by assigning specific frame identification codes to the individual functions in advance such that, for example, the s-th bit of the r-th byte of the frame having the frame identification code 11 indicates the small-lamp switch, even in the case where the small-lamp switch is included in the combination switch node or the meter node.

Secondary, in the embodiment as shown in FIG. 22, since the priority control of the frame involves the local address, it is necessary to determine the frame format in consideration of the priority between nodes, so that the system design would be troublesome. If the frame identification code independent of any node address is provided so that address data is not included in the frame, however, the frame identification code itself serves as the priority bit of the frame. This means that the switch signal is itself given with the priority, so that the system design for determining the frame format does not need to consider the priority between nodes.

Figure 23:
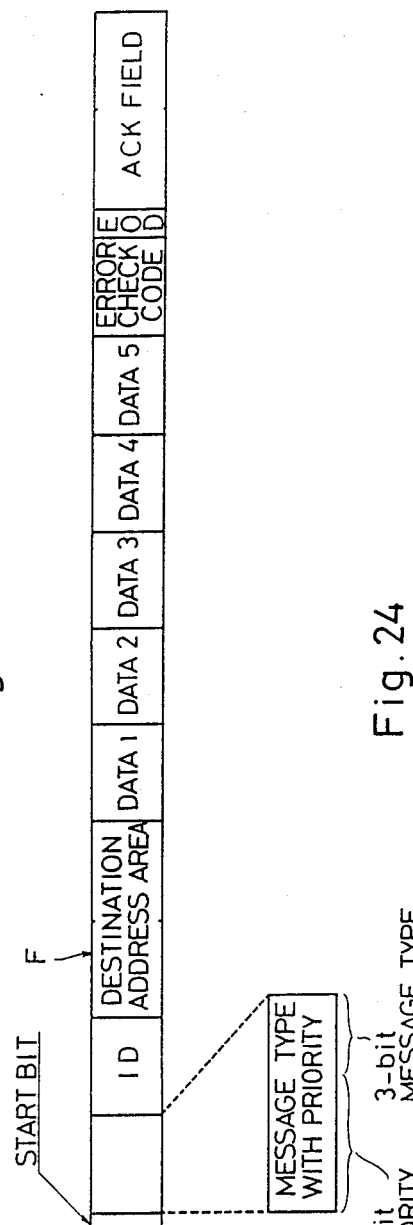

In the case where various message types with different addressing systems are affixed at the beginning of the frame, the frame format as shown in FIG. 23 can be easily realized which has a message type identification code with priority further provided preceding to the frame identification code of the format shown in FIG. 22. In the frame format shown in FIG. 23, the message type identification code with priority may be constituted by a 5-bit priority bit and a 3-bit message type identification code. The greater the priority number, the higher the priority given at the time of collision. The use of the message type identification code ensures that various message type can be used when desired.

The embodiments as shown in FIGS. 21, 22 and 23 have been explained with reference to the case where the quantity of data is fixed or the number of bytes for all the data is fixed. These embodiments can of course be applied to the case where the quantity of all the data is variable.

Each multiplex node ND has the circuit arrangement as shown in FIG. 25, in which detection signals of various sensors in the vehicle and ON/OFF signals of the switches are input to an input circuit 10 and the different input signals are supplied to a central processing unit (CPU) 12. The CPU 12 performs an arithmetic operation on the input signals as needed and sends the signals, which need to be transmitted to a communication controller 14, in the form of data in the aforementioned frame. The communication controller 14 produces an error check code and affixes it to the data, and further affixes a start bit and an EOD to the resultant data, thus preparing the final form as a frame. The communication controller 14 executes a coding operation (PWM) coding, etc.) on the frame as needed and sends the frame F onto the multiplex transmission path MS. When the ACK signals for acknowledgement of the transmitted frame F are returned from all the remaining nodes coupled to the network, the communication controller 14 completes the data transmission. On the other hand, when any ACK signal that should be returned is not returned, the communication controller 14 considers that some of the reception nodes have not properly received the frame and repeats the transmission of the frame. When the ACK signal that should be returned is not successively returned by a predetermined number of times even after the frame retransmission, the communication controller 14 considers that the associated node is abnormal and stops the frame retransmission, thus preventing the multiplex transmission path MB from being full of signals.

The communication controller 14 in each of the reception multiplex nodes receives the frame F transmitted on the multiplex transmission path MB, decodes it as needed, checks the received data by means of the error check code, etc., and sends bit "1" in the associated ACK signal return area following the frame at a specific timing if no error is detected. If a data error occurs, bit "1" is not set in the associated ACK signal return area.

It is discriminated from the bit value of the IDP code of the frame whether or not the received frame includes data necessary for the reception node. The following two methods may be used to determine the reception or disregarding of the received frame.

The first method permits the communication controller 14 to make the decision. In this case, the communication controller 14 has a reception IDP code table, and discriminates that the received frame is necessary for the associated node when the IDP code included in the frame coincides with the one listed in its own reception IDP code table, and supplies the data of the frame to the CPU 12. When the IDP code of the received frame does not coincide with the one listed in the reception IDP code table, the communication controller 14 does not supply the data of the frame even though the associated node returns the ACK signal. In this case, since the CPU 12 is in no way initiated in determining the necessity of the received frame, the load of the CPU 12 can be reduced. In this case, although the reception IDP code table provided in communication controller 14 corresponds to the aforementioned reception function table used in the second prior art system, the ACK signal is returned for every frame in the transmission system according to this embodiment, unlike in the case of the second prior art system. Therefore, the transmitting node discriminates that the signal transmission is successful if the ACK signals are returned from all the nodes coupled to the network, except itself. This can eliminate the need to provide a table corresponding to the function address-physical address correction table used in the second prior art system, thus requiring a small memory capacity in the communication controller 14.

The second method permits the CPU 12 to make the decision regarding the necessity of the received frame. In this case, all the data received by the communication controller 14 is supplied to the CPU 12 which checks the IDP code to select the necessary data and abandon the unnecessary one. According to the first and second methods, since the CPU 12 should assign data storage addresses using the IDP code, the second method can be realized in terms of software without modifying the programs executed by the CPU 12. However, although the second method increases the frequency of the data transmission to the CPU 12 from the communication controller 14, the communication controller 14 can be realized with a smaller scale as compared with the one involved in the prior art systems. More specifically, the second method eliminates the need to use a memory corresponding to the function address-physical address correlation table and the reception function table which are used in the second prior art system, thus reducing the scale of the communication controller.

The data selected by either one of the above methods is compared and processed, as needed, with another signal in the CPU 12 to produce control signals for driving a predetermined actuator and the like in the vehicle and the control signals are supplied to an output circuit 16 to drive the target actuator and the like.

Although the system having no node address included in the frame needs a slightly greater circuit scale and puts greater load on the CPU than the first embodiment, this system can execute the transmission of the necessay data between the individual nodes, irrespective of the node address or the location information. Even if a change is made to a signal to be transmitted from the transmitting node or to a signal to be received by the reception nodes, therefore, it is unnecessary to modify the destination on the reception side or the transmission side for every change. This provides easy means to deal with a possible design modification.

Figure 24:
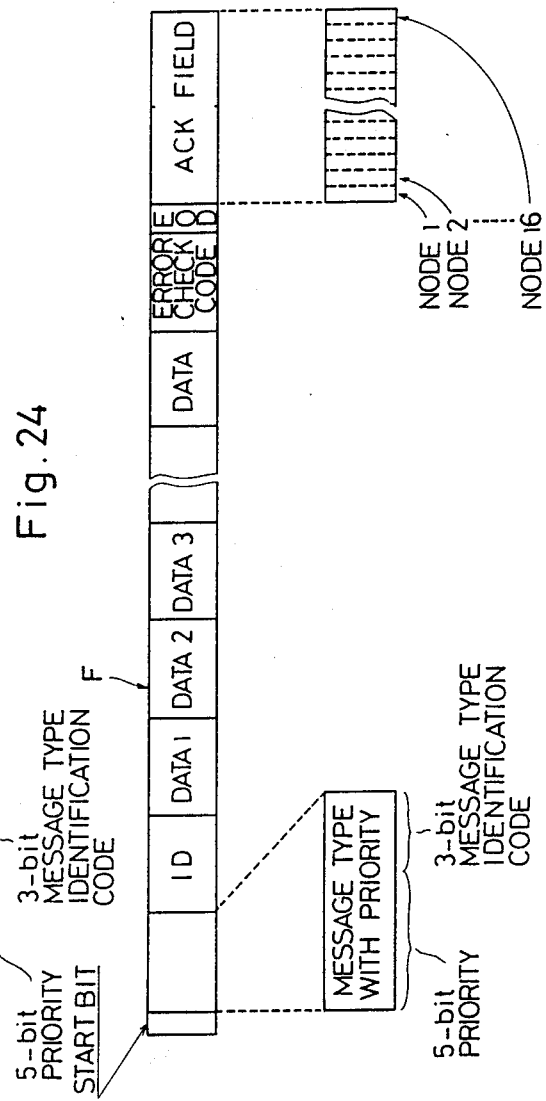
FIG. 24 is an exemplary diagram illustrating a still further example of the frame format used in the multiplex transmission system of this invention.

The above embodiment uses the frame identification code independent of any node address also as the IDP code for indicating the priority of messages. Alternatively, a priority code may be provided in addition to the frame identification code ID as shown in FIG. 23. In this example, a 3-bit code is added to identify the message type. FIG. 24 illustrates a modification of the frame structure of FIG. 23 in which the data length is variable.

What is claimed is:

1. A multiplex transmission method, in which one of a plurality of nodes, as a transmitting node, mutually coupled together through a transmission path transmits data frame by frame to at least one of other nodes as at least one reception node, and said at least one of reception node returns a reception acknowledge signal to said transmitting node upon proper reception of said frame of data, said multiplex transmission method comprisiing the steps of:

providing a reception acknowledge signal area including a plurality of bits following said frame transmitted from said transmitting node;
   dividing said reception acknowledge signal area into a plurality of bit areas;
   respectively assigning said divided bit areas to said plurality of nodes; and
   causing said at least one reception node to return said reception acknowledge signal to said transmitting node from one of said respectively assigned bit areas of said reception acknowledge signal area.

2. The multiplex transmission method according to claim 1, wherein a pulse width modulation code for discriminating a binary logic based on a size of a pulse width is used as a transmission code at least in said reception acknowledge signal area.

3. The multiplex transmission method according to claim 1, wherein a destination designation area having a same length as said reception acknowledge signal area is provided in a frame and is divided into a plurality of bit areas, said divided bit areas of said destination designation area are respectively assigned with said plurality of nodes and destination nodes are specified by respective bit areas of said destination designation area of said frame.

4. The multiplex transmission method according to claim 3, wherein upon reception of said reception acknowledge signal from said at least one reception node, said transmitting node compares a content of said reception acknowledge signal area with a content of said destination designation area of said frame so as to discriminate successfulness of a signal transmission.

5. A multiplex transmission method, in which one of a plurality of nodes, as a transmission node, mutually coupled together through a transmission path transmits data frame by frame to a plurality nodes of said other nodes as reception nodes, and said reception nodes return reception acknowledge signals to said transmitting node upon proper reception of said frame of data, said multiplex transmission method comprising the steps of:

providing a reception acknowledge signal area including a plurality of bits following said frame transmitted from said transmitting node;

dividing said reception acknowledge signal area into a plurality of bit areas;

respectively assigning said divided bit areas to said plurality of nodes; and causing said reception nodes to respectively return said reception acknowledge signals to said transmitting node from said respectively-assigned bit areas of said reception acknowledge signal area.

* * * * *